United States Patent
Karmarkar et al.

(10) Patent No.: US 8,938,643 B1
(45) Date of Patent: Jan. 20, 2015

(54) CLONING USING STREAMING RESTORE

(75) Inventors: Saurabh Sitaram Karmarkar, Maharashtra (IN); Hrishikesh Arvind Date, Maharashtra (IN); Sujit Shrinivas Shembavnekar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 428 days.

(21) Appl. No.: 13/092,207

(22) Filed: Apr. 22, 2011

(51) Int. Cl.
*G06F 11/00* (2006.01)

(52) U.S. Cl.
USPC .......................................................... 714/11

(58) Field of Classification Search
CPC ....................................................... G06F 11/00
USPC .................................................. 714/707, 11
See application file for complete search history.

(56) References Cited

U.S. PATENT DOCUMENTS

| | | | |
|---|---|---|---|
| 8,825,970 B1 * | 9/2014 | Grunwald et al. | 711/162 |
| 2008/0163210 A1 * | 7/2008 | Bowman et al. | 718/1 |
| 2011/0314471 A1 * | 12/2011 | Ramos et al. | 718/1 |
| 2012/0110574 A1 * | 5/2012 | Kumar | 718/1 |
| 2012/0191908 A1 * | 7/2012 | North et al. | 711/112 |
| 2012/0227058 A1 * | 9/2012 | Hunt et al. | 719/318 |
| 2014/0040887 A1 * | 2/2014 | Morariu et al. | 718/1 |

* cited by examiner

*Primary Examiner* — Amine Riad
(74) *Attorney, Agent, or Firm* — Campbell Stephenson LLP

(57) ABSTRACT

Various systems and methods for creating a clone using streaming restore. For example, one method can involve receiving a set of storage blocks that include data associated with a state of a source computing entity. The method then involves creating a clone of the source computer system at an endpoint computer system. The endpoint computer system creates the clone by restoring the storage blocks, which involves storing the storage blocks to a memory at the endpoint computer system. The created clone has a state that corresponds to the state of the source computer system.

19 Claims, 6 Drawing Sheets

CLONING USING STREAMING RESTORE

FIELD OF THE INVENTION

This invention relates to cloning computer systems and, more particularly, to creating a clone of a computing system by streaming portions of the computing system's information to an endpoint computing device.

DESCRIPTION OF THE RELATED ART

It is sometimes desirable to have multiple computer systems with identical configurations. For example, it may be desirable to have a failover server computer system for redundancy purposes. When a server needs to be brought offline, e.g., for scheduled maintenance or due to hardware or software failure, a failover server that has been previously configured to perform the same functions as the server can be brought online and any applications using the server can continue operating without interruption.

In the example above, the failover server can be configured by creating a clone of the server. A clone is an identical copy of a source computer system. A clone initially has all the same data, software, and configuration information as the source computer system. Creating and setting up a clone can be a time consuming and resource intensive procedure. Such a procedure can negatively impact performance of the environment in which the source computer system and the clone operate.

SUMMARY OF THE INVENTION

Various systems and methods for creating a clone using streaming restore are disclosed. For example, one method can involve receiving a set of storage blocks that include data associated with a state of a source computing entity. The method then involves creating a clone of the source computer system at an endpoint computer system. The endpoint computer system creates the clone by restoring the storage blocks, which involves storing the storage blocks to a memory at the endpoint computer system. The created clone has a state that corresponds to the state of the source computer system.

In an embodiment, the source computer system is a virtual machine and the clone is a physical machine. The method can also involve broadcasting concurrently to several endpoint computer systems and creating a clone at each of the several endpoint computer systems. In embodiment, the endpoint computer system begins restoring the blocks as the blocks are received, without waiting for receipt of all of the blocks being sent from the source computer system.

The method can also involve creating a map that identifies each storage block being sent by the source computer system. The method can also involve creating the clone in response to detecting that all the storage blocks have been received.

In an embodiment, the method is resumable. In such an embodiment, creating the clone can be paused in response to detecting an interruption in the blocks being received at the endpoint computer system. In response to detecting that the receiving has resumed, the creating can be resumed where the creating was left off.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
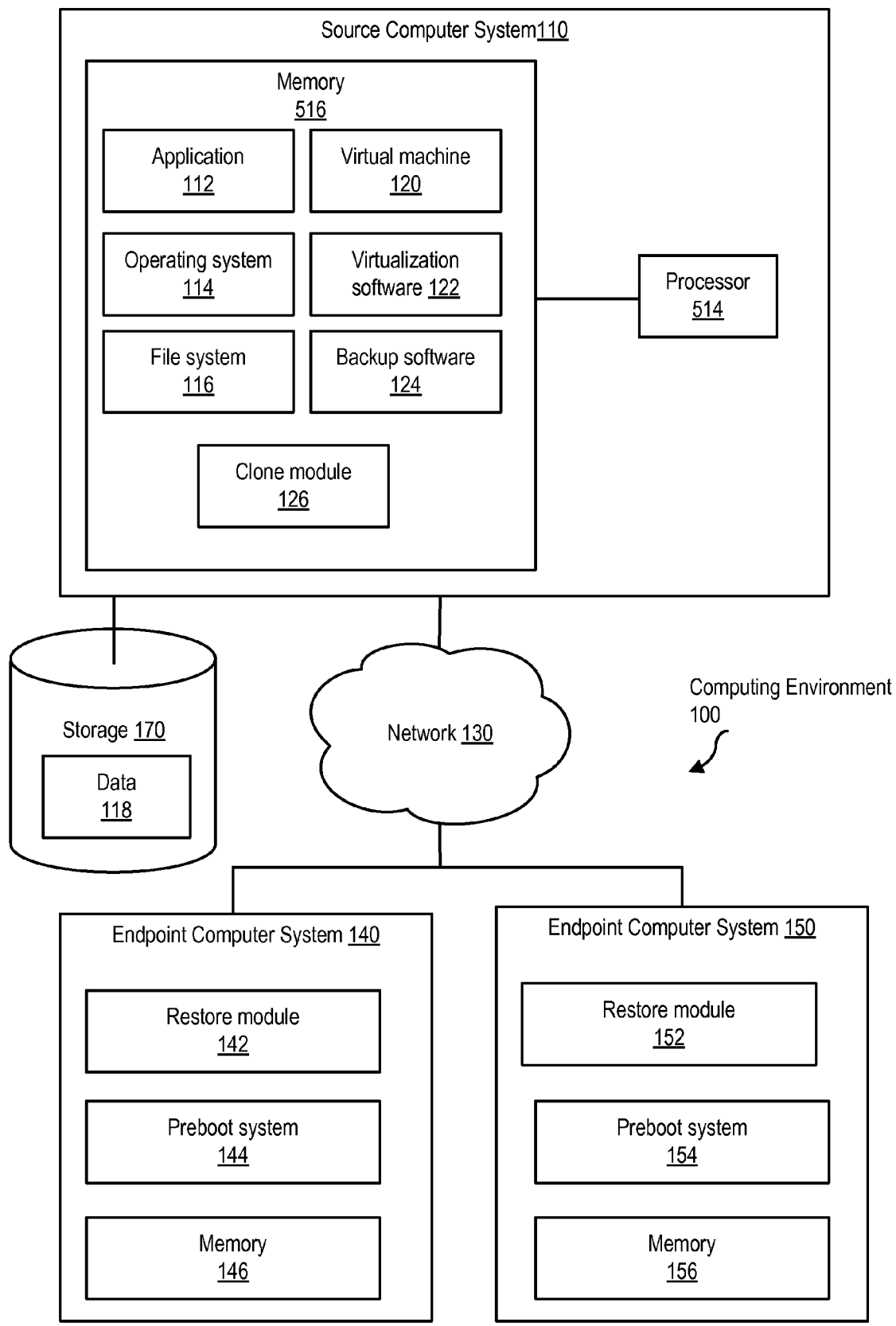
FIG. 1 is a block diagram of a computing environment that performs cloning using streaming restore, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

In the context of computer systems, a clone is a computing entity that is a copy of another computing entity. The computing entity that is copied is referred to herein as a source, or in certain scenarios, a source computer system, more specifically. Various different types of computing entities can be cloned. For example, a clone can be created for a wide variety of computing entities, including, for example, storage devices, storage volumes, entire physical or virtual computing systems, and the like. Using a source such as the aforementioned source computing system as an example, creating a clone involves making a copy of the source computer system's then-current state. This can include the state of some or all of the following: application software (stored and/or executing), the operating system, data, hardware (e.g., processor state), and/or other such information as may be employed by the source computer system in its operations. For example, creating a clone of the source computer system can involve copying all data stored in one or more volumes that store all data used to set up and run the source computer system. Thus, the state of the source computer system is duplicated on another computer system, such that a clone of the source computer system having the same state as the source computer system is established at the other computer system (e.g., a different physical computer system). A source computer system can be a physical computer system (such as a workstation or server), or a logical (i.e., conceptual) construct (e.g., a virtual computer system such as a virtual machine (a term that will be used extensively throughout the remainder of the instant Specification)). Likewise, a clone can be a physical computer system or a virtual machine.

Clones can be useful in a number of contexts. For example, a system administrator may provision a number of computers (e.g., servers) in a data center (e.g., a production environment, a server farm and/or the like) with identical or nearly identical configurations of various computer resources (e.g., software applications, hardware devices, operating system, network components, clustering software and the like). As an example, such a datacenter may be used by an organization as a disaster recovery site. Numerous clones can be provisioned in order to recover from a disaster (e.g., a flood, a power outage, an inoperative computer and/or the like), which could otherwise result in the loss of valuable data, and almost certainly in a loss in productivity. The term disaster recovery (DR) refers to various actions performed to provide computing resources in the event of such disasters, as well as equipment failures and the like within a data center. As noted, such failures can result from any number of causes, including, for example, component failures (e.g., hardware or software failures), natural disasters, power outages, or other such technical disasters (e.g., virus attacks).

Another example in which clones may be useful is the scenario in which a company develops new hardware and/or software and has need of multiple computer systems that can be reconfigured quickly and easily. Such a company may utilize a number of identical test machines, each machine being configured with several software applications.

Clones can also be useful for failover in high-availability systems. If a system (e.g., a server) fails or needs to be taken offline for maintenance, an architecture employing clones can allow application and other processes executing on the server to be failed over to a clone of the server. Such a failover operation can be performed transparently (e.g., without a user of the application being aware of the failover or detecting any noticeable degradation in performance).

One way to create a clone is to make a full backup of the given source computer system. Such a full backup can be created, for example, by backup software. Backup software produces a file, generally referred to as a backup image, that is stored in a storage location assigned for the backup image. The backup software can transfer the backup image from the source computer system to the computer system upon which a clone is to be created The clone typically executes in a recovery environment, e.g., does not execute a fully-functional operating system, until the backup image is fully restored. The backup image can be implemented as a bootable file such that executing the backup image on the clone effectively results in a system in which the software and data are already installed. Alternatively, the clone can parse the backup image, and then extract and install the components contained in the backup image.

The foregoing approach to creating a clone can negatively impact system performance: creating the backup image is a resource-intensive process that can take a significant amount of time. Such a backup image is also large, in relative terms, often rivaling the source computer system in terms of the amount of storage space consumed. Thus, storing a backup image can use a significant amount of storage space. Transferring the backup image from the source computer system to a storage location, and then again from the storage location to the clone system is also a resource-intensive operation, involving, at the least, significant transmission bandwidth. A related issue is the relatively long time that the transfer of such a large amount of data can take. Yet another problem faced in the use of such techniques is the fact that a backup image is static, by it's very nature, meaning that changes to the source computer system that occur after the backup image is created are not captured in the backup image. In order to capture any such changes, a new backup image is created. This compounds the time, space, and bandwidth issues discussed above.

Further, errors may occur while transferring the backup image, either from the source computer system to the storage location, or from the storage location to the clone system. Thus, a failure (e.g., a loss of connectivity between the storage location and the clone system) necessitates the transfer being restarted from the beginning. Put another way, in some implementations, the transmission of the backup image is not resumable. This means that when connectivity (e.g., between the storage location and clone system) is restored, the transmission of the backup image cannot simply be resumed from the point in the backup image at which the transmission was terminated, but instead must be restarted from the beginning.

An alternative approach, in which a clone is created without creating a backup image, is described herein. Such an approach avoids the performance impacts associated with the creating, storing, and transmitting of backup images associated with other approaches. In an approach such as is described herein, a clone module is designed to transfer data, representing the state of a source computer system (e.g., a physical or virtual computer system's application software, operating system, application data, and so on), from that source computer system to another computer system in a series of data blocks. The computer system receiving the data blocks, on which the clone is to be created, can then create a clone of the source computer system by restoring the data blocks, with such restoration being performed as the data blocks are received, upon the receipt of all such data blocks, each time some number of data blocks have been received, or by some other advantageous paradigm. As a result of such a process, the clone of the source computer system has the same state as that of the source computer system, at the point at which the clone module transferred the data representing the source computer system's then-current state. As the result of such a process, such clones can be created relatively quickly.

FIG. 1 is a block diagram of a computing environment 100. As shown, computing environment 100 includes a source computer system 110 coupled to endpoint computer system 140 and endpoint computer system 150 via network 130. Network 130 can include a WAN (Wide Area Network), such as the Internet, one or more LANs (Local Area Networks), and/or one or more SANs (Storage Area Networks). The computing systems depicted in FIG. 1 are not limited to communicating over network 130 but can also communicate with each other via a direct connection, a wireless network connection, or any other communications infrastructure.

Source computer system 110 is a computing device such as a personal computer, laptop computer, server, personal digital assistant, cell phone, or the like. Source computer system 110 includes at least one processor 514 and a memory 516. Source computer system 110 can include and/or be coupled (e.g., via a bus, network, or other appropriate interconnect) to a storage device 170.

Primarily, storage device 170 provides persistent data storage, such that data stored in storage device 170 will remain stored even after storage device 170 is powered off. Storage device 170 can include one or more storage devices or storage appliances such as, for example, a solid state drive, a hard disk, a compact disc (CD), a digital versatile disc (DVD), sequential access media (e.g., tape storage), or other mass storage device, file serving appliance, or storage system (e.g., a redundant array of independent disks (RAID) system or an optical storage jukebox). Storage device 160 can also include one or more types of storage media, including solid state media (e.g., flash drives), optical media (e.g., CDs and DVDs), and magnetic media (e.g., hard disks or magnetic tape). In an embodiment, storage device 170 can be implemented using cloud storage, in which storage device 170 is a logical storage device to which physical storage device(s) are allocated on an as-needed and/or as-contracted basis. Storage device 170 can be formatted with any appropriate file system, such as the New Technology File System (NTFS).

Storage 170 includes data 118. Data 118 can include data used by source computer system 110. This includes application data, such as word processing files, media files, database files, and the like. Metadata can also be included within data 118, such as file system information identifying which blocks of storage 170 store what data, access times, permissions, and the like.

Memory 516 stores program instructions executable by processor 514 to implement an application 112, an operating system 114, file system 116, virtual machine 120, virtualization software 122, backup software 124, and a cloning module 126. Cloning module 126 can be included in and/or interact with backup software 124 to create a clone of source computer system 110 or a portion thereof.

Application 112 can be a word processing program, email program, graphic editing program, database application, server program, or the like. Application 112 accesses (e.g., by generating and/or consuming) data 118 on storage device 170.

Operating system 114 controls the hardware of source computer system 110 and provides various services to applications executing on source computer system 110. These services can include one or more services related to monitoring the current usage of system resources, such as memory 516 and/or processor 514. For example, operating system 114 can provide an application programming interface (API) or other interface that allows an application to access information identifying the current usage of system resources. As another example, operating system 114 can allow an application to request notifications indicating times at which the current usage of system resources has passed (either exceeded or dropped below) a certain threshold.

File system 116 can organize data, such as data 118 in storage 170, into files and directories. File system 116 can maintain a listing of the physical locations of files and data in storage 170. For example, when operating system 114 creates a new file, operating system 114 can inform file system 116 of parameters of the file, such as size and type, associations, and various other metadata. With this information, file system 116 can determine which physical blocks, e.g., in storage 170, will store data for the file. Similarly, when a write is directed to storage 170, file system 116 assigns specific physical blocks to store the data that is written. File system 116 keeps track of which physical blocks are used, and which files store data in the used physical blocks, and which physical blocks are unused. While file system 116 is shown in FIG. 1 as a stand-alone module, file system 116 can be included in another element, e.g., in operating system 114 or in storage 170.

FIG. 1 further illustrates a virtual machine 120. In general terms, virtual machine 120 is a software construct that acts as a physical computer system. For instance, virtual machine 120 can include and execute applications, provide services, and process commands. A virtual machine has its own operating system, such as Microsoft Windows® or Unix, and can interface with virtualization software on a host.

Virtualization software 122 performs operations related to creation and management of virtual machines and resources for virtual machines. Virtualization software 122 is illustrated as a stand-alone module but can also be included in operating system 114. Virtualization software 122 provides source computer system 110 the ability to concurrently support one or more virtual machines, such as virtual machine 120. Virtualization software 122 provides such ability by coordinating the distribution of computer resources (e.g., processing power, memory, etc.) to a virtual machine so that the virtual machine operates similarly to a physical computer.

Virtualization software 122 coordinates and manages demands by virtual machines for host computer system resources. Virtualization software 122 can be executed on "bare hardware" (e.g., execute on physical hardware, without use of or need for intervening software). This is referred to as a native virtual machine. Alternatively, virtualization software 122 can interface with the physical hardware of source computer system 110 via operating system 114 (also referred to as a hosted virtual machine). As will be appreciated, however, one or more of the functions of virtualization software 122 can be implemented directly in hardware, rather than being implemented in software. Using the foregoing example, virtualization software 122 can be designed to support virtual machines by coordinating processor resources to support the execution of instructions on behalf of the virtual machines, and performing memory management to help ensure that the virtual machines effectively share the host computer's system memory.

Source computer system 110 is capable of performing full and/or incremental backups. Full backups copy of the targeted data (e.g., all of data 118) to the backup image. In contrast, an incremental backup is defined relative to a prior backup and only includes those data objects that have been modified subsequent to the point-in-time at which the prior backup was created.

In an embodiment, backup software 124 generates a point-in-time copy of all or part of data 118. Backup software 124 can perform file-level backups (e.g., in which data is backed up on a file-by-file basis, and thus the data objects on which backup is performed are files) or volume-level backups (e.g., in which data is backed up at the volume level, and thus the data objects are fixed-size units of data such as blocks, extents, or clusters) by creating a point-in-time copy of data 118, such as a snapshot. A snapshot provides a map, or logical representation, that identifies which blocks, e.g. of storage 170 store data associated with source computer system 110. For example, memory 516 and storage 170 can be logically organized as a single volume. Backup software 124 can generate a snapshot of the volume, thus creating a map of all data used by source computer system 110.

Clone module 126 is configured to receive a clone creation command, e.g., from an administrative user. In response to receiving such a clone creation command, clone module 126 causes a copy of all data necessary to set up a clone of a source at an endpoint to be sent from the source to the endpoint. The clone creation command specifies what data is being cloned. The clone creation command can specify a system name or address, such as an IP address, of a computing entity to clone. For example, the clone creation command could specify that virtual machine 120 is to be cloned. The clone creation command also specifies one or more destinations, or endpoint computer systems, where the clone is to be established. For example, the clone creation command could specify that virtual machine 120 is to be cloned to endpoint computer system 140 and endpoint computer system 150.

In response to receiving a clone creation command, clone module 126 causes backup software 124 to create a snapshot of the source computer system specified in the command, e.g., source computer system 110. Clone module 126 reads data from blocks identified by the snapshot and transmits the blocks as the aforementioned data blocks, e.g., via network 130, to endpoint computer system 140. Clone module 126 can traverse the snapshot, and sequentially transmit each data block identified by the snapshot to endpoint computer system 140. Clone module 126 can also include information identifying a sequence number for each data block. For example, clone module 126 can include information in the first data block indicating that the first data block is the first in a sequence of data blocks. If the snapshot identifies, for example, 100 data blocks, clone module 126 can add information to the first data block indicating that the first data block is data block 1 of 100. Once clone module 126 has transmitted the blocks identified by the snapshot, clone module 126 can send a notification to endpoint computer system 140 that all data blocks for a given clone have been sent.

In an embodiment, clone module 126 can broadcast the data blocks to multiple endpoint computer systems. This allows multiple clones of a single source to be established concurrently at multiple endpoint computer systems. Endpoint computer system 140 includes restore module 142, preboot system 144, and memory 146. Endpoint computer system 150 includes components similar to those of endpoint computer system 140, which perform similar functions. Namely, endpoint computer system 150 includes restore module 152, preboot system 154, and memory 156. Restore module 142 interacts with clone module 126 to establish a clone, e.g., of source computer system 110, on endpoint 140.

Preboot system 144 includes hardware and software that provides an environment that allows endpoint computer system 140 to perform basic functions, such as receive information via network 130, and install and boot an operating system. An example of such a preboot methodology is the Preboot Execution Environment (also commonly referred to as PXE). While preboot system 144 is shown as a stand-alone module, some or all of preboot system 144 can be included within other elements of endpoint computer system 140, e.g., in memory 146.

While endpoint computer system 140 is executing preboot system 144, endpoint computer system 140 also executes restore module 142. Restore module 142 can interact with clone module 126 to receive data blocks transmitted by clone module 126 over network 130. Restore module 142 can store each data block received in memory 146. Restore module 142 can restore each data block as the data block is received, as groups of data blocks are received, or at a later time, in toto, for example. In response to detecting an interruption in receipt of data blocks from clone module 126, restore module 142 can pause the restore operation until transmission resumes.

Restore module 142 can be designed to detect, for example, that all data blocks that make up a clone have been received and restored. In response to such detecting, restore module 142 can terminate execution of preboot system 144 and boot the clone.

Figure 2:
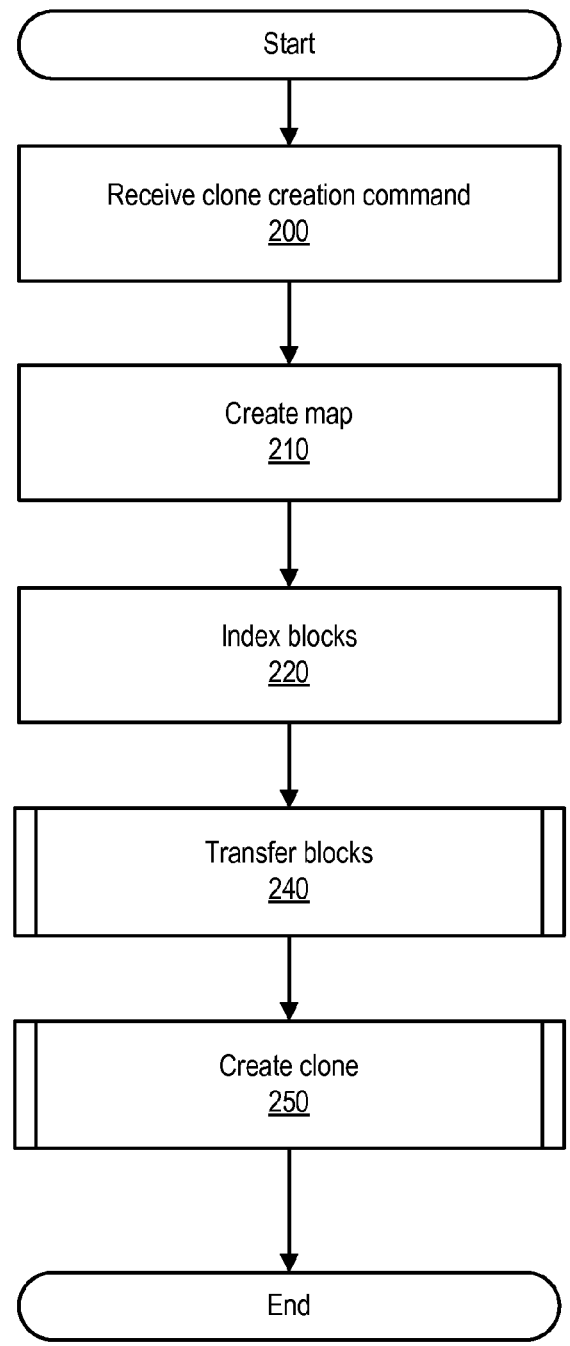
FIG. 2 is a flowchart of a method of performing cloning using streaming restore, according to one embodiment of the present invention.

FIG. 2 is a flowchart of a method of creating a clone of a source computer system using streaming restore techniques. The method is an example of a process performed by a clone module, such as clone module 126 of FIG. 1, operating in conjunction with a restore module, such as restore module 142 of FIG. 1. The method involves creating a clone of a source computing entity and bringing the clone online at an endpoint computing entity. In an embodiment, the restore module creates a clone of a physical system, e.g., source computer system 110 of FIG. 1, on another physical system, e.g., endpoint computer system 140 of FIG. 1. Alternatively, the restore module can create a clone of a virtual system, e.g., virtual machine 120 of FIG. 1, on a physical system, e.g., endpoint computer system 140 of FIG. 1.

The method begins at 200, with receipt of a clone creation command. The clone creation command can be received in response to a manual initiation of a cloning operation. For example, a user can manually specify that a clone of a given source computer system be created. Alternatively, the clone creation command can be received in response to an automatic initiation of a cloning operation. For example, an operating system, such as operating system 114 of FIG. 1, or other software entity, can detect the occurrence of a clone creation condition. Such a condition can be, for example, detection of an update to software, changes to data that render a previous clone obsolete or out-of-date, or the passing of an "expiration date" (i.e., the expiration of a specified length of time since creation of a previous clone), in the case of periodic clone operations. Such a clone creation command can specify, for example, the source computing system that is to be cloned, one or more endpoint computer systems at which a clone of the source computer system is to be created, and other such parameters.

At 210, the clone module initiates the creation of a map (e.g., a snapshot) of the source computing entity. In an embodiment, the clone module instructs backup software, e.g., backup software 124 of FIG. 1, to create a snapshot of the source. A snapshot has the advantages that a snapshot can be created relatively quickly, and that a snapshot is relatively small, e.g., uses a small amount of data storage.

The snapshot provides a map of the set of blocks used by the source to store the data used by the source computer system, including application data, metadata, software, and configuration information. At 220, the clone module assigns numbers to the blocks in this set, e.g., beginning with number one for the first block, two for the second block, and so on. Thus, the snapshot can be broken into a sequence of numbered blocks. At 240, the clone module transfers (e.g., streams) the data blocks, corresponding to the blocks in the set, to one or more endpoint computer systems, as discussed in greater detail with regard to FIG. 3.

Figure 3:
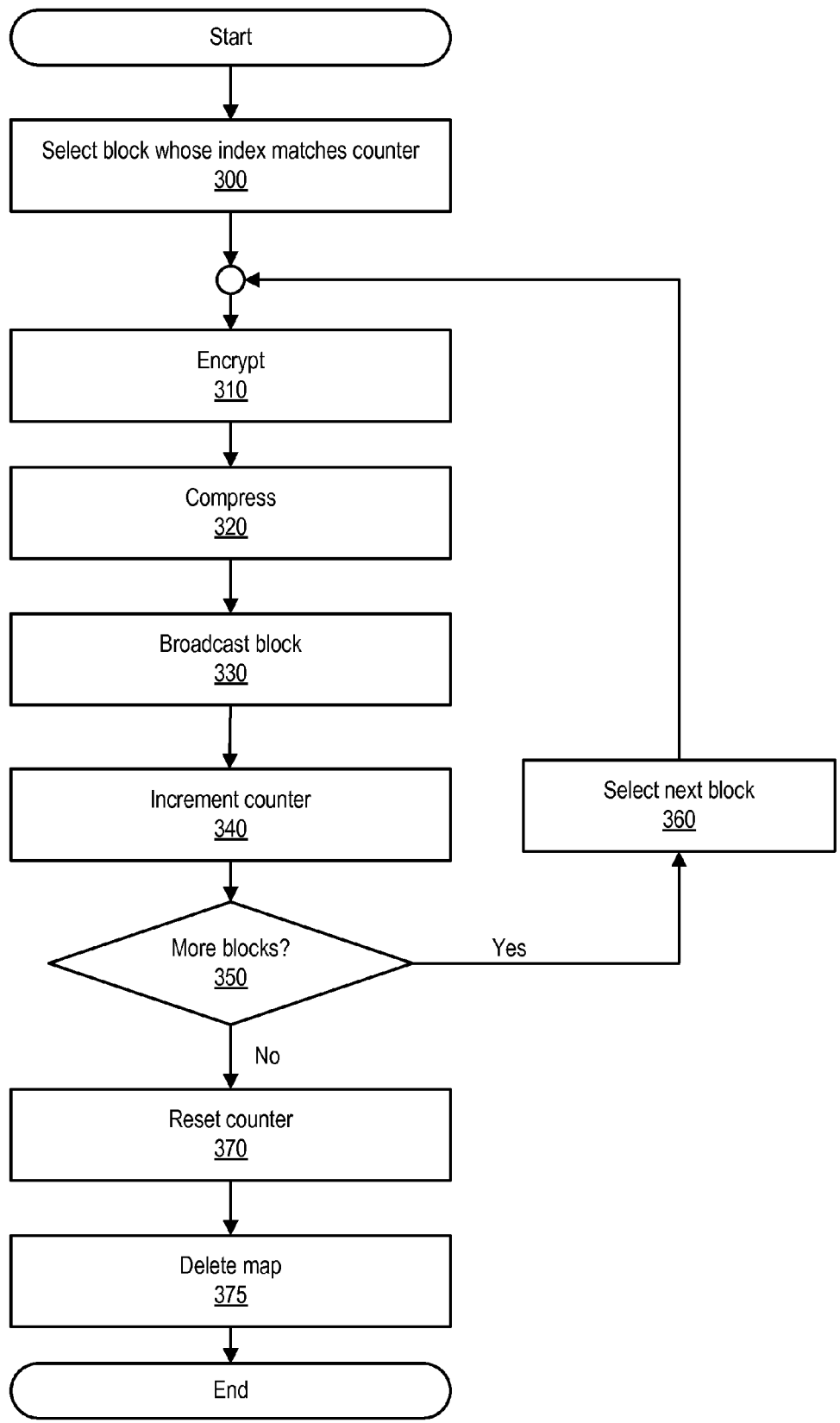
FIG. 3 is a flowchart illustrating additional elements of a method of performing cloning using streaming restore, according to one embodiment of the present invention.

FIG. 3 is a flowchart illustrating additional elements of a method of performing cloning using streaming restore. At 300, the clone module selects a block from a set of blocks identified by a snapshot. The clone module maintains a counter for each clone operation. This enables the clone module to resume a clone operation in response to detecting that the clone operation is interrupted. An example of such functionality is one in which the clone module is performing a clone operation that involves sending blocks from a source computer system to an endpoint computer system. In such a scenario, the snapshot for this clone operation identifies 100 blocks. After sending the $25^{th}$ block, there is a loss in communication between the clone module and the endpoint computer system. Such a loss in communication can occur as a result of, for example, a failure of a communications medium between the source computer system and the endpoint computer system (e.g., network outage) or as a result of a hardware or software error of the source computer system.

Subsequent to the loss in communication in this example, communication is reestablished between the source computer system and endpoint computer system. In response to detecting that communications are reestablished, the clone module is able to detect which block(s) should be sent to the endpoint computer system such that the clone operation is resumed at the point at which the clone operation was suspended due to the communications failure. In an embodiment, this involves detecting the value of a counter that indicates which block is the next to be sent. In the example, the clone module resumes the clone operation by sending the $26^{th}$ block identified by the snapshot to the endpoint computer system. Through its ability to track the point to which a clone operation has progressed, the clone module is able to resume the clone operation at that point. Resuming a clone operation at the point at which the clone operation was interrupted (referred to herein as resumable clone operations), rather than aborting and restarting from the beginning, can provide significant performance advantages by reducing the overall amount of data that needs to be transferred from a source computer system to an endpoint computer system, when performing a clone operation that encounters a failure.

In a scenario in which the value of the counter is zero at 300, the clone module begins a new clone operation by accessing a snapshot of a source computer system and selecting the first block identified in the snapshot. After selecting a block to transmit, the clone module encrypts the block at 310. While not mandatory, encryption is desirable, as doing so provides additional security to the data being transferred from the source computer system to the endpoint computer system.

At 320, the clone module compresses the block. While not mandatory, compressing the block is desirable, as doing so reduces the amount of transmission bandwidth used to transmit the block from the source computer system to the endpoint computer system. This provides the performance benefit of reducing the overall amount of time taken to perform the clone operation.

At 330, the clone module then broadcasts the selected block to one or more endpoint computer systems (as a data block, if the block has been subjected to any sort of processing, such as that mentioned above). For example, the clone module can detect one or more endpoint computer systems identified in the clone creation command and broadcast the selected block to each endpoint computer system identified therein. In this way, multiple clones can be created concurrently, thus reducing the time taken to, for example, provision multiple systems for testing hardware and/or software. In an embodiment, the clone module can better ensure reliable communication by waiting for an acknowledgement that the transmitted block was received from each restore module the clone module sent the block to. If an acknowledgement is not received in a timely manner, the clone module resends the block to the restore module that failed to acknowledge receipt of the block.

After broadcasting a data block, the clone module increments, at 340, a counter that indicates the number of blocks that have been transmitted during the given clone operation. At 350, the clone module detects whether more data blocks remain to be transmitted as part of the clone operation. In an embodiment, the clone module compares the counter value with a value that represents the total number of blocks identified in the snapshot. If the comparison indicates that data blocks remain to be transmitted (e.g., the counter value is less than the number of blocks identified in the snapshot), the clone module selects the next block at 360 and the process returns to 310, where the block is encrypted. The process then continues. If no additional data blocks remain to be transmitted, the clone module resets the counter at 370. At 375, the clone module deletes the map, (e.g., snapshot), and (at least from the perspective of the clone module) the clone operation ends.

Figure 4:
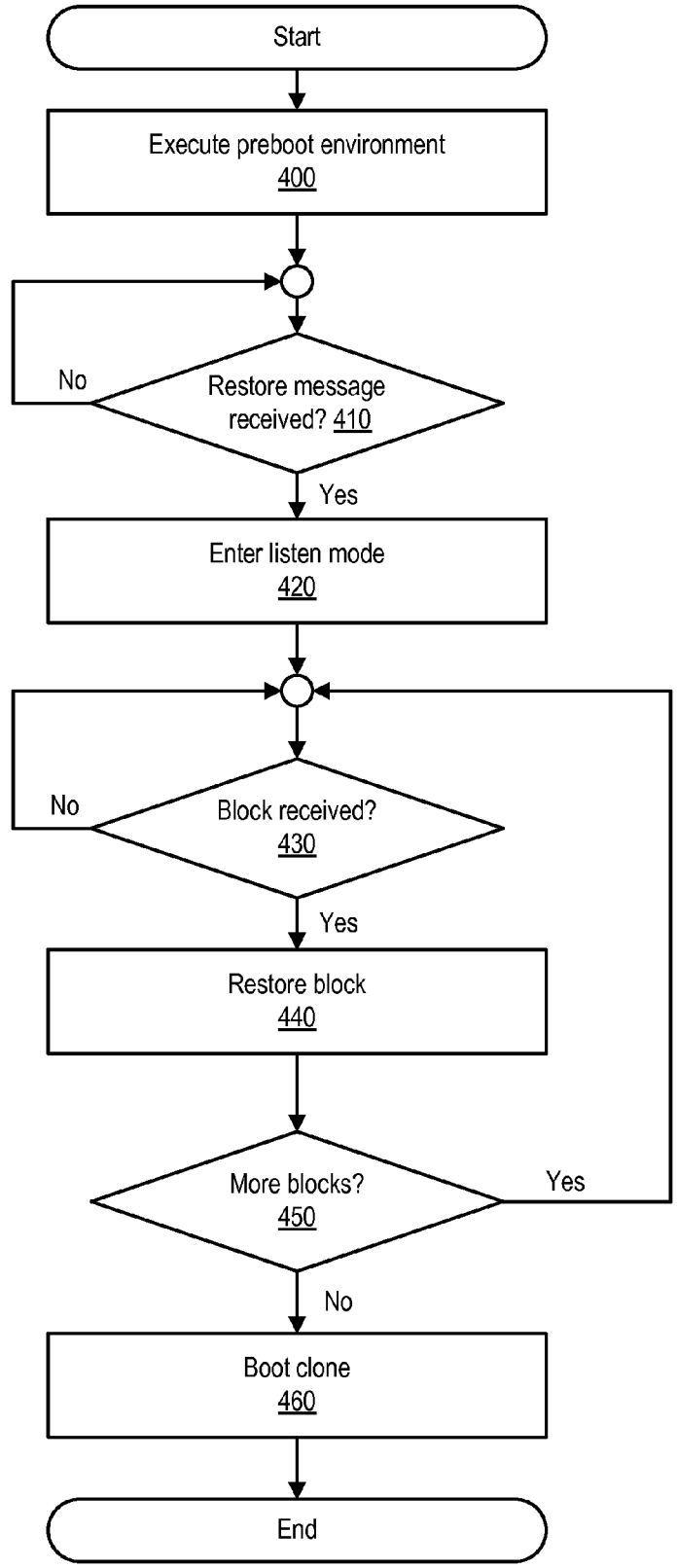
FIG. 4 is a flowchart illustrating additional elements of a method of performing cloning using streaming restore, according to one embodiment of the present invention.

Returning to FIG. 2, at 250 the restore module creates a clone at an endpoint computer system, as discussed in greater detail with regard to FIG. 4. After the clone is created, the method of FIG. 2 ends. FIG. 4 is a flowchart illustrating additional elements of a method of performing cloning using streaming restore. At 400, the endpoint computer system that is the target of the clone operation executes a preboot environment, such as Preboot Execution Environment (PXE), discussed earlier in connection with FIG. 1. At 410, the restore module detects whether a clone operation has begun. In an embodiment, this involves receiving a message, e.g., from the clone module, indicating that a clone operation has begun. In response to receiving such a message, the restore module performs any set up or clean up operations that relate to the ongoing clone operation. At 420, the restore module enters a listen mode.

As depicted at 430, the endpoint computer system determines that a data block has been received. At 440, the restore module then restores the data block. In an embodiment, the restore module can simply store the data block without restoring that data block (e.g., storing the data block in memory 146 of FIG. 1). In such an embodiment, the restore module receives and stores some or all of the data blocks sent by the clone module and then restores the blocks after the data blocks associated with this particular clone operation have been received.

Once the data block in question has been received, the restore module detects whether data blocks remain to be received at 450. In an embodiment, the restore module checks a received data block for a sequence number and compares that sequence number with a value indicating the number of data blocks in the clone. This number can be carried within a data block. Alternatively, the clone module can send this value to the restore module in a separate transaction. As another example, the clone module can send a separate message indicating that no data blocks remain to be sent. If the restore module detects that data blocks of the clone remain to be received, the method returns to 430, where the restore module awaits the receipt of the additional data blocks.

In an embodiment, the restore module can detect that a block that has been received is not the block that was expected. For example, the restore module can detect that a received block has an sequence number that is out of order, or is not the expected next number in the sequence. In response to detecting an out of sequence block, the restore module can transmit a message to the clone module requesting that the clone module resend the block having the expected sequence number. The message can include the sequence number of the block that was not received. The restore module can store the out of sequence block(s) until the expected block is received.

After the restore module detects that the data blocks of the clone have been received, and has restored these blocks, the restore module boots the clone, at 460. This involves booting an operating system (e.g., the operating system received as part of the blocks received from the clone module).

Figure 5:
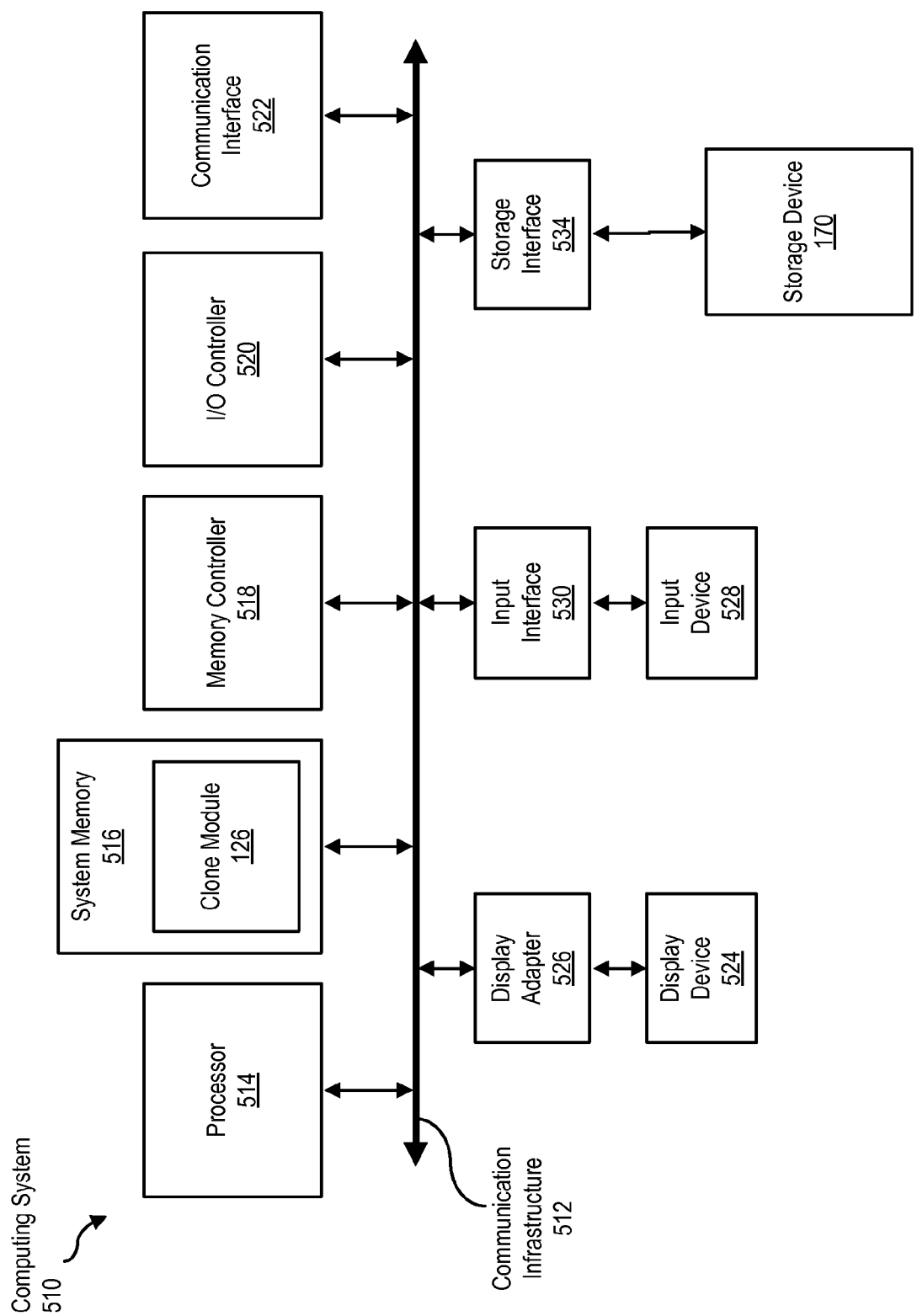
FIG. 5 is a block diagram of a computing device, illustrating how a clone module can be implemented in software, according to one embodiment of the present invention.

FIG. 5 is a block diagram of a computing device, illustrating how a clone module 126 can be implemented in software. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a clone module 126, computing system 510 becomes a special purpose computing device that is configured to participate in cloning with streaming restore.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing all or some of the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. In one example, program instructions implementing a RAM module 135 may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 550, and storage interface 554.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1594 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 550. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a data storage device 533 coupled to communication infrastructure 512 via a storage interface 534. Storage device 533 generally represents any type or form of storage device or medium capable of storing data and/or other computer-readable instructions. For example, storage device 533 may include a magnetic disk drive (e.g., a so-called hard drive), a floppy disk drive, an optical disk drive, a flash drive, or the like. Storage interface 534 generally represents any type or form of interface or device for transferring data between storage device 533 and other components of computing system 510.

In certain embodiments, storage device 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 533 may also include other similar structures or devices for allowing computer software, data, or other computer-readable instructions to be loaded into computing system 510. For example, storage device 533 may be configured to read and write software, data, or other computer-readable information. Storage device 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
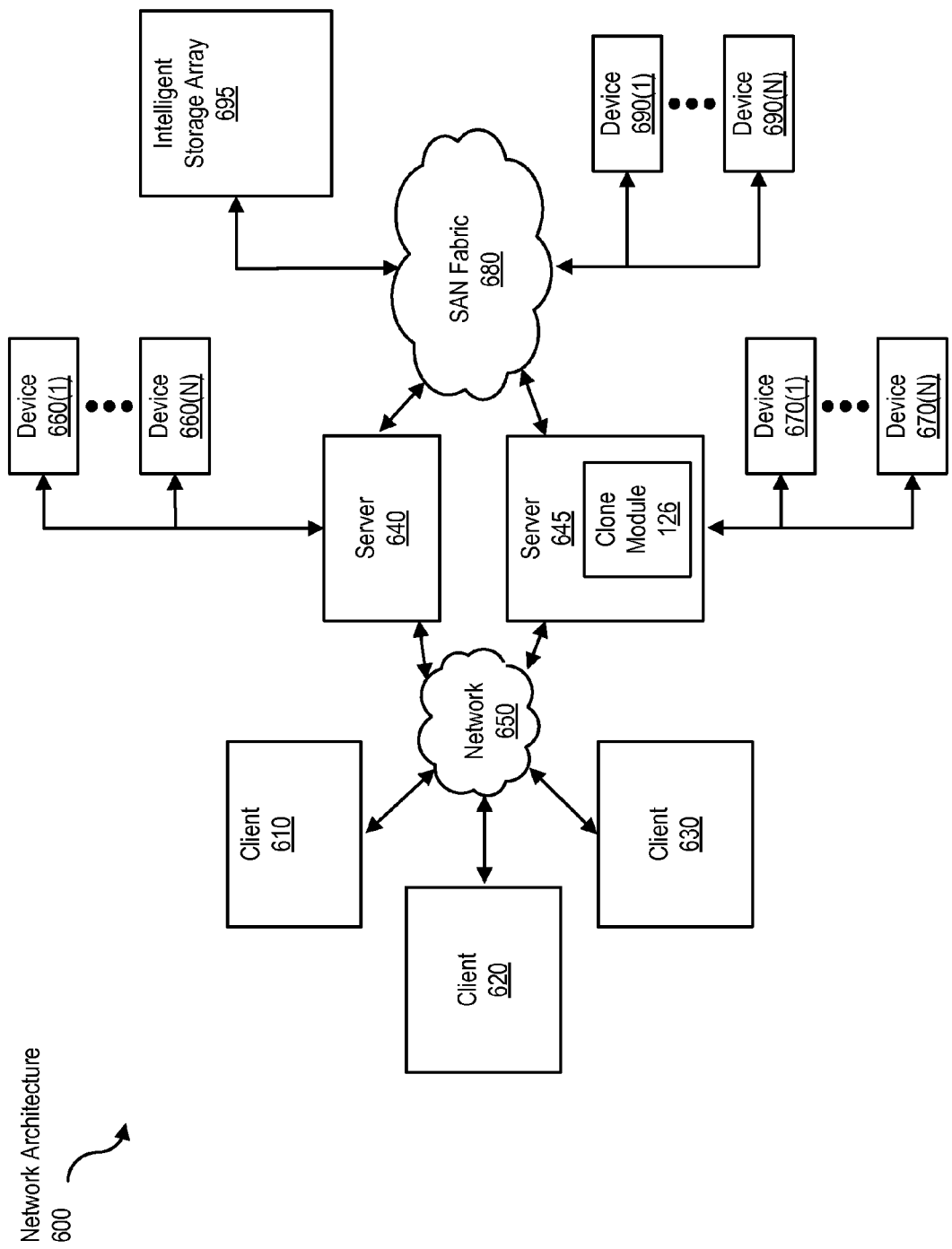
FIG. 6 is a block diagram of a networked system, illustrating how various computing devices can communicate via a network, according to one embodiment of the present invention.

FIG. 6 is a block diagram of a network architecture 600 in which client systems 610, 620, and 630 and servers 640 and 645 may be coupled to a network 650. Client systems 610, 620, and 630 generally represent any type or form of computing device or system.

Similarly, servers 640 and 645 generally represent computing devices or systems, such as application servers or database servers implemented on a computing device such as computing system 510 in FIG. 5, configured to provide various database services and/or run certain software applications. Network 650 generally represents any telecommunication or computer network including, for example, an intranet, a wide area network (WAN), a local area network (LAN), a personal area network (PAN), or the Internet. In one example, servers 640 and/or 645 may include a RAM module 135 as shown in FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client systems 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of the computing devices in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an archive module in FIG. 1 may transform behavior of a computing device in order to cause the computing device to create a clone using streaming restore.

Although the present invention has been described in connection with several embodiments, the invention is not intended to be limited to the specific forms set forth herein.

On the contrary, it is intended to cover such alternatives, modifications, and equivalents as can be reasonably included within the scope of the invention as defined by the appended claims.

What is claimed is:

1. A method comprising:
receiving a set of data blocks at an endpoint computing device, wherein
the data blocks comprise data associated with a state of a source computing entity, and
the blocks are received according to a predetermined sequence;
creating a clone of the source computing entity at the endpoint computing device, wherein
the endpoint computing device is configured to create the clone by independently restoring each data block of the set of data blocks at the endpoint computing device,
the restoring comprises
reading a sequence number associated with the each data block,
confirming whether the sequence number matches an expected sequence number, and
copying the data to a memory, and
a state of the clone corresponds to the state of the source computing entity; and
booting the clone, wherein
the booting the clone comprises booting an operating system received in the set of data blocks, and
the booting the clone is performed in response to detecting that all data blocks of the set of data blocks have been received at the endpoint computing device.

2. The method of claim 1, wherein
the source computing entity comprises a virtual machine, and
the clone comprises a physical computing system.

3. The method of claim 1, wherein
multiple copies of the data blocks are concurrently broadcast to a plurality of endpoint computing devices, and
each endpoint computing device of the plurality of endpoint computing devices is configured to create a respective clone of the source computing entity.

4. The method of claim 1, wherein
the endpoint computing device is configured to commence the restoring prior to receiving all data blocks in the set of data blocks.

5. The method of claim 1, wherein
each data block of the set of data blocks is identified by a map of the source computing entity, wherein
the map is created by the source computing entity.

6. The method of claim 1, further comprising:
pausing the creating at a first point in response to detecting an interruption of the receiving, wherein the first point corresponds to a number of the data blocks having been received at the endpoint computing device; and
resuming the creating at the first point in response to detecting a resumption of the receiving.

7. The method of claim 1, wherein
the endpoint computing device executes a pre-boot execution environment, and
execution of the pre-boot environment is terminated in response to the detecting that all data blocks of the set of data blocks has been received at the endpoint computing device.

8. A computer readable storage medium storing program instructions executable to:
receive a set of data blocks at an endpoint computing device, wherein
the data blocks comprise data associated with a state of a source computing entity, and
the blocks are received according to a predetermined sequence;
create a clone of the source computing entity at the endpoint computing device, wherein
the endpoint computing device is configured to create the clone by independently restoring each data block of the set of data blocks at the endpoint computing device,
the restoring comprises
reading a sequence number associated with the each data block,
confirming whether the sequence number matches an expected sequence number, and
copying the data to a memory, and
a state of the clone corresponds to the state of the source computing entity; and
boot the clone, wherein
booting the clone comprises booting an operating system received in the set of data blocks, and
booting the clone is performed in response to detecting that all data blocks of the set of data blocks have been received at the endpoint computing device.

9. The computer readable storage medium of claim 8, wherein
the source computing entity comprises a virtual machine, and
the clone comprises a physical computing system.

10. The computer readable storage medium of claim 8, wherein
multiple copies of the data blocks are concurrently broadcast to a plurality of endpoint computing devices, and
each endpoint computing device of the plurality of endpoint computing devices is configured to create a respective clone of the source computing entity.

11. The computer readable storage medium of claim 8, wherein
the endpoint computing device is configured to commence the restoring prior to receiving all data blocks in the set of data blocks.

12. The computer readable storage medium of claim 8, wherein
each data block of the set of data blocks is identified by a map of the source computing entity, wherein
the map is created by the source computing entity.

13. The computer readable storage medium of claim 8, wherein the program instructions are further executable to:
pause the creating at a first point in response to detecting an interruption of the receiving, wherein the first point corresponds to a number of the data blocks having been received at the endpoint computing device; and
resume the creating at the first point in response to detecting a resumption of the receiving.

14. A system comprising:
one or more processors; and
a memory coupled to the one or more processors, wherein
the memory stores program instructions executable by the one or more processors to:
receive a set of data blocks at an endpoint computing device, wherein
the data blocks comprise data associated with a state of a source computing entity, and
the blocks are received according to a predetermined sequence;

create a clone of the source computing entity at the endpoint computing device, wherein
the endpoint computing device is configured to create the clone by independently restoring each data block of the set of data blocks at the endpoint computing device,
the restoring comprises
reading a sequence number associated with the each data block,
confirming whether the sequence number matches an expected sequence number, and
copying the data to a memory, and
a state of the clone corresponds to the state of the source computing entity; and
boot the clone, wherein
booting the clone comprises booting an operating system received in the set of data blocks, and
booting the clone is performed in response to detecting that all data blocks of the set of data blocks have been received at the endpoint computing device.

15. The system of claim 14, wherein
the source computing entity comprises a virtual machine, and
the clone comprises a physical computing system.

16. The system of claim 14, wherein
multiple copies of the data blocks are concurrently broadcast to a plurality of endpoint computing devices, and
each endpoint computing device of the plurality of endpoint computing devices is configured to create a respective clone of the source computing entity.

17. The system of claim 14, wherein
the endpoint computing device is configured to commence the restoring prior to receiving all data blocks in the set of data blocks.

18. The system of claim 14, wherein
each data block of the set of data blocks is identified by a map of the source computing entity, wherein
the map is created by the source computing entity.

19. The system of claim 14, wherein the program instructions are further executable to:
pause the creating at a first point in response to detecting an interruption of the receiving, wherein the first point corresponds to a number of the data blocks having been received at the endpoint computing device; and
resume the creating at the first point in response to detecting a resumption of the receiving.

* * * * *